United States Patent [19]

Asano et al.

[11] Patent Number: 4,720,180
[45] Date of Patent: Jan. 19, 1988

[54] HIGH MAGNIFICATION RANGE ZOOM LENS

[75] Inventors: Toshiaki Asano, Kanagawa; Sadatoshi Takahashi, Tokyo; Sadahiko Tsuji, Kanagawa, all of Japan

[73] Assignee: Canon Kabushiki Kaisha

[21] Appl. No.: 475,532

[22] Filed: Mar. 15, 1983

[30] Foreign Application Priority Data

Mar. 19, 1982 [JP] Japan .................. 57-45235

[51] Int. Cl.⁴ ................ G02B 15/14; G02B 9/64
[52] U.S. Cl. ................................. 350/427
[58] Field of Search ..................... 350/427, 423

[56] References Cited

U.S. PATENT DOCUMENTS 4,256,381  3/1981  Kreitzer ............... 350/423
4,527,867  7/1985  Fujioka et al. ......... 350/427

*Primary Examiner*—John K. Corbin
*Assistant Examiner*—Rebecca D. Gass
*Attorney, Agent, or Firm*—Toren, McGeady & Associates

[57] ABSTRACT

The disclosed zoom lens has at least four lens groups with proper refractive powers operating such that while the third lens group counting from front is held stationary, the first and second lens groups and at least one of the fourth lens group and those that follow are moved axially in differential relation to effect zooming. A given range of variation with zooming of the image magnification of the second lens group and a given differential relation for the zooming movement of the first and second lens groups achieve good stability of aberration correction over an extended zooming range.

5 Claims, 13 Drawing Figures

FIG.5-1　　FIG.5-2　　FIG.5-3
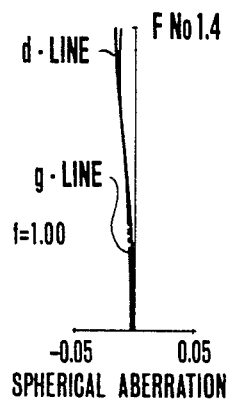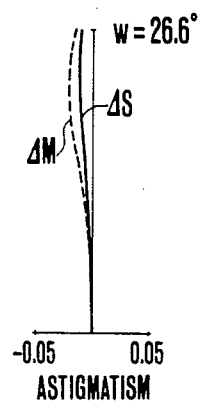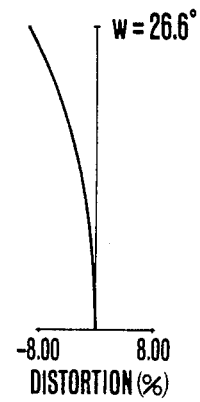
FIG.5-4　　FIG.5-5　　FIG.5-6
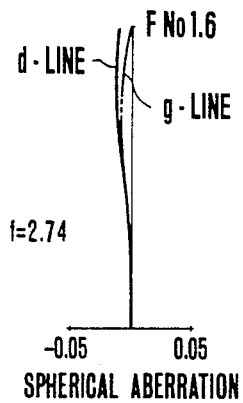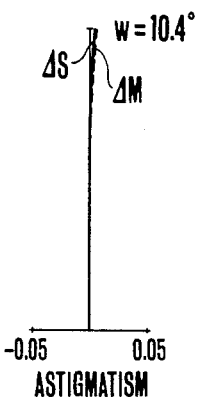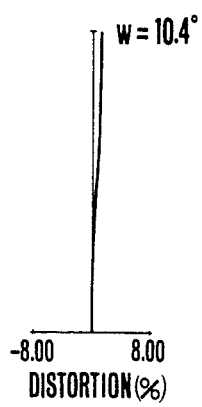
FIG.5-7　　FIG.5-8　　FIG.5-9
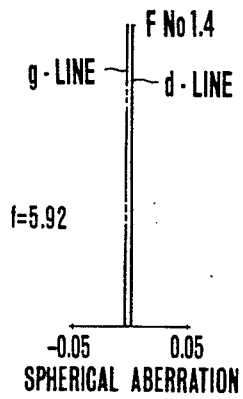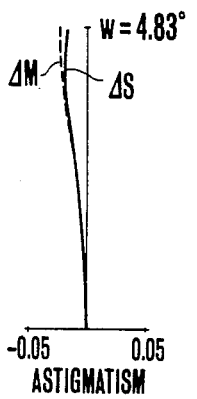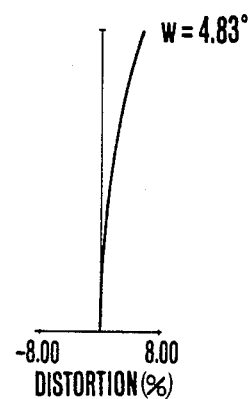

HIGH MAGNIFICATION RANGE ZOOM LENS

BACKGROUND OF THE INVENTION

1. Field of the Invention

This invention relates to zoom lenses, and more particularly to high-magnification range zoom lenses which have at least four lens groups at least three of which are movable for zooming, and which maintain good stability in aberration correction throughout the zooming range.

2. Description of the Prior Art

In a zoom lens system, to change the image magnification while maintaining a constant image plane position, it is necessary to use at least two lens components axially movable in differential relation to each other. Recently, a demand has arisen for zoom lens as of this type with a greatly increased zoom ratio, but in which the bulk and size of the entire system is reduced to a minimum.

If the zoom ratio is increased by increasing the total movement of a variator, the space over which the variator moves must be widened. Thus, the total length of the lens is increased. Such means are, therefore, undesirable.

In general, to obtain a zoom lens of greatly increased zoom ratio while still permitting minimization of the bulk and size, the prior art methods involved strengthening the refractive power of each movable zoom lens group, a reduction in the total movement of the variator, and shortening the axial separations between the lens groups. However, increasing the refractive power of each movable zoom lens group introduces the following drawbacks:

(1) Good correction of aberrations becomes difficult.
(2) The operating mechanism for the lens groups must have a very high accuracy. If this requirement is not fulfilled sufficiently, the optical performance is lowered remarkably.

Increasing the number of movable zooming lens groups to provide a zoom lens with reduced bulk and size is disclosed in Japanese Laid-Open Pat. No. Sho 54-30855 (hereinafter referred to as a "conventional zoom lens").

This conventional zoom lens comprises, from front to rear, a first lens group of positive power, a second lens group of negative power, these two groups constituting a first varifocal assembly, a third lens group of positive power and another lens group arranged either in front, or in rear, of the third lens group, the last two constituting a second varifocal assembly. When zooming from the wide angle to the telephoto positions, the first, second and third lens groups are axially moved in relation to each other so that the first and second varifocal assemblies both exhibit range extending effects. Another effect of this conventional zoom lens occurs when zooming from the wide angle to the telephoto position. Then the second varifocal assembly contributes to an image magnification range which includes unity. On the other hand, by moving the first lens group forward, a magnification changing burden is imposed upon the second lens group, provided that the image magnification of the second lens group does not exceed unity.

Also in the conventional zoom lens, because the zoom ratio is as small as about 3, when the zoom ratio is increased further, the required total movement of the third lens group increases. This produces the following drawbacks with respect to the aforementioned other lens group, which is stationary during zooming, when arranged in front of the third lens group:

1(a) A large space through which the third lens group can move must be created. This makes it difficult to shorten the longitudinal length of the zoom lens.

1(b) The light bundles emerging from the third lens group tend to diverge. Hence the height of incidence of the pencil of rays on the third lens group becomes higher and the diameter of the lens is increased. Also the third lens group produces large aberrations and correcting these aberrations makes the design of the third lens group unavoidably complicated. Increasing the zoom lens ratio also results in the following disadvantages when arranged in rear to the third lens group and the aforementioned other lens is stationary during zooming.

2(a) Because a large air separation between the second and third lens groups is necessarily preserved in the wide angle positions, it becomes difficult to minimize the longitudinal length of the zoom lens.

2(b) Because the total zooming movement of the third lens group increases, and because the pencil of rays strikes the third lens group at a higher height relative to the optical axis, a result similar to that described in paragraph 1(a) occurs. This is not desirable.

These drawbacks of the conventional zoom lens have been found to be ascribable to the fact that the first varifocal lens assembly which would otherwise primarily have a high magnification changing effect is constructed and arranged to provide a low magnifiction range. Moreover a heavy range extending burden is borne by the second varifocal assembly, with the result that the total movement of the movable or third lens group forming part of the second varifocal assembly is increased.

Besides the above, other zoom lenses are known having at least four lens groups of which three are made movable for zooming, as, for example, disclosed in Japanese Laid-Open Patent No. Sho 50-149360 and Japanese Patent Nos. Sho 41-13667 and 44-14877.

SUMMARY OF THE INVENTION

It is an object of the present invention to provide a zoom lens having a range as high as 6 and which limits the bulk and size to a minimum while still permitting good stability of aberration correction throughout the extended range.

To achieve the object of the present invention, the lens groups forming the high magnification range zoom lens has at least four lens groups of which the first counting from the front is of positive power, the second is of negative power, the third is of positive power and the fourth is of positive power, the third lens group is made stationary during zooming, and the first and the second lens groups and at least one of the fourth lens groups and those that follow the fourth lens group are made movable for zooming, so the second lens group is provided for use in a range of variation of image magnification includes unity of magnification, and when in the telephoto position, as compared with the wide angle position, the first lens group lies on the object end, the second lens group on the image end.

BRIEF DESCRIPTION OF THE DRAWINGS

FIGS. 5-1 through -9 are graphic representations of the aberrations of the zoom lens of FIG. 4 in different focal length positions.

DETAILED DESCRIPTION OF THE PREFERRED EMBODIMENTS

In the high magnification range zoom lens of the invention, the refractive power of the first lens group is made positive to offer the advantage that the diameters of the second and following lens groups can be made small. This contributes to a minimization of the bulk and size of the entire lens system.

The refractive power of the second lens group is made negative so that the distance from the object point to the image point assumes a negative value. This also contributes to minimizing the bulk and size of the lens. The third lens group is fixed in position, and given a positive refractive power, the axial separation between the second and fourth lens groups is reduced, and the height of incidence of light rays on the fourth lens group as measured from the optical axis is lowered as much as possible, to thereby avoid production of higher order aberrations. The fourth lens group has a positive refractive power and when selected as a zoom group, is made to depict a convex curve toward the front as it moves during zooming. Thus, a prescribed extended zooming range is achieved.

By providing the second lens group for use in a range of variation of image magnification that includes unity of magnification, an advance in the compactness, an increase in the relative aperture and an increase in the zoom ratio are effectively achieved.

In the conventional zoom lens, because the second group is used not to allow the image magnification range to extend to unity, since an unduly heavy range extending burden is placed on the third and fourth lens groups forming the second varifocal assembly, the total zooming movement of the 3rd lens group tends to increase.

In the zoom lens according to the invention, unlike the zooming arrangement of the conventional zoom lens, the range of variation with zooming of the image magnification of the second lens group is chosen to include unity of magnification, thereby the magnification changing effect of the second lens group is heightened. This is explained by using FIG. 1.

Figure 1:
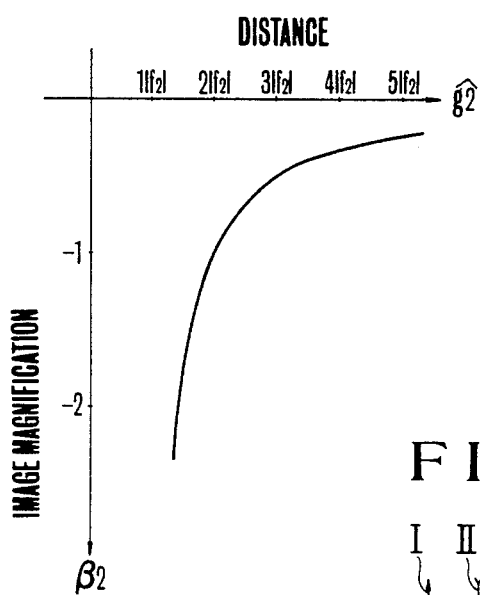
FIG. 1 is a graph illustrating variation of the image magnification while zooming with one lens group of a zoom lens.

FIG. 1 depicts how the image magnification of the second lens group varies.

In the same graph, the distance from the front principal point of the 2nd lens group to an object point for the 2nd lens group, $\hat{g}2$, is in the abscissa, the sign of the distance being taken as positive when the aforesaid object point lies on the image side of the aforesaid front principal point of the second lens group, and as negative when on the object side, and the image magnification, $\beta2$, of the second lens group is in the ordinate. Now when the focal length of the second lens group is taken at a value f2 (where f2 < 0), the relationship between the object distance $\hat{g}2$ and the image magnification $\beta2$ may be expressed by:

$$\beta2 = \frac{1}{\frac{\hat{g}2}{f2} + 1} \quad (a)$$

From the graph it is understood that as the object distance $\hat{g}2$ continuously decreases, the image magnification $|\beta2|$ increases. It is to be noted here that in a region including unity of image magnification or $\beta2 = -1$, the rate of variation of the image magnification $\beta2$ with the object distance $\hat{g}2$ is far steeper than in the region of $\beta2 = -1$.

This means that the selection of the region of object distances $\hat{g}2$ for inclusion of the image magnification $\beta2 = -1$ provides the advantage that a higher magnification changing result can be obtained by a lesser change of the object distance $\hat{g}2$.

In the present invention, in order to obtain a zoom lens of high zoom ratio, the object distance $\hat{g}2$ is made to vary so that the image magnification varies in a region including $\beta2 = -1$. Another feature of the invention is that to facilitate an advance in compactness, the duty of changing the object distance $\hat{g}2$ is divided between the first and second lens groups.

That is, as zooming is performed from the shortest focal length position to the longest focal length position, the first lens group is made to move forward, and the second lens group to move rearward. In more detail, as the second lens group approaches the object point, a so-called first sort of magnification change results, and as, at the same time, the object point approaches the second lens group, a so-called second sort of magnification change results. The cooperation of those functions, creates the possibility of greatly extending the range of variation of focal length.

The fourth lens group in the zoom lens of the invention is made to move axially such as to maintain the constant position of the image plane during zooming.

Another feature of the invention is that the power distribution over the system is chosen so that the pencil of rays exiting from the third lens group converges, to thereby achieve a minimization of the diameters of the fourth and following lens groups. Such power distribution has the advantage that the higher order aberrations which would otherwise arise when the exiting pencil of rays enters the fourth lens group at higher heights can be as suppressed as much as possible. Thus, while permitting good correction of aberrations, a high magnification range, compact zoom lens is more effectively achieved.

Now letting the focal length of the third lens group be denoted by f3 (where f3 > 0) and the distance from the front principal point of the third lens to an object point for the 3rd lens by $\hat{g}3$, and giving a positive sign to the distance when the object point lies on the image side of the aforesaid principal point of the third lens group and negative sign when on the front side, then for the pencil of rays exiting from the third lens group converges, we have $$\hat{g}3 < -f3 \quad (b)$$

where the object distance $\hat{g}3$ can be defined by using the image magnification $\beta2$ and focal length f2 of the second lens group as follows:

$$\hat{g}3 = (1-\beta2)f2 - (f2w' - f2) \quad (c)$$

wherein l2w' is the axial separation between the second and third lens groups when in the shortest focal length position, and l2 is the amount of movement of the second lens group from the position for the shortest focal length which is taken as positive when moved rearward.

As is evident from equation (c), the larger the image magnification $|\beta 2|$, the larger the object distance $|\hat{g}3|$. Particularly in a region including $\beta 2 = -1$, even a slight change of the object distance $\hat{g}2$, and, therefore, a slight change of the l2, allows a large change in the image magnification $\beta 2$ to be obtained. Thus, when the image magnification $\beta 2$ is made to change in a range including $\beta 2 = -1$, the object distance $|\hat{g}3|$ also assumes large values. This is of great significance for the condition (b) that rules the convergency of the pencil of rays after emergence from the third lens group is easy to satisfy.

Figure 2:
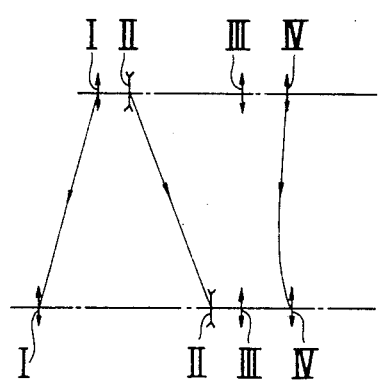
FIGS. 2 and 3 are schematic diagrams illustrating optical arrangements of first and second embodiments of the present invention, amd are considered to explain the differential relations of the zoom groups moved during zooming.

The following explanation refers to specific embodiments of the zoom lens according to the present invention. FIG. 2 illustrates the first embodiment of the invention where four lens groups are used in constituting a zoom lens and, in expanded form, the paths of movement of the zoom groups as the focal length varies. The arrow in the drawing indicates the direction of movement of the zoom group. The aforesaid four lens groups comprise, from front to rear, a first lens group I of positive refractive power, a second lens group II of negative refractive power, a third lens group III of positive refractive power, and a fourth lens group IV of positive refractive power, wherein when zooming, the aforesaid third lens group remains stationary, and the aforesaid first, second and fourth lens groups are moved axially in differential relation.

A table 1, shows the paraxial refractive power arrangement of the first embodiment, where fi is the focal length of the i-th lens group, and ei is the separation between the principal points of the i-th and (i+1)th lens groups.

$\beta i$ is the image magnification of the i-th lens group.

Since, in this embodiment 1, a large proportion of the magnification increasing burden is imposed on the second lens group, the image magnification of a combined system of the third and fourth lens groups increases as the focal length increases from the shortest to an intermediate one, and then decreases as it further increases from the intermediate to the longest one.

In connection with the actual movement of the lens groups, the fourth lens group moves forward by a short distance when zooming from the shortest focal length position to an intermediate focal length position, and then backward or rearward when zooming from the aforesaid intermediate focal length position to the longest focal length position. Therefore, the separation between the third and fourth lens groups can be minimized. Also since the optical arrangement of the zoom lens provides the shortest separation between the second and third lens group when in the longest focal length position, despite the great increase in the zoom ratio, a valuable advance in the compactness has been achieved.

It is to be also noted that the image magnification of the third lens group is negative, and the refractive power arrangement assures the convergence of the pencil of rays exiting from the third lens group, thus contributing to more effectively facilitate the achievement of the advance in the compactness of the zoom lens.

Figure 3:
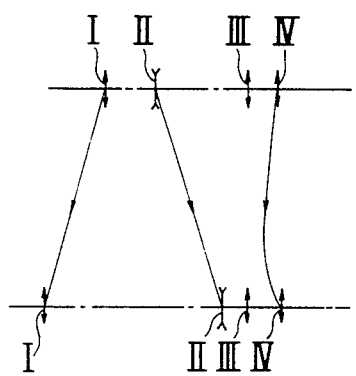

FIG. 3 is similar to FIG. 2 except that the second embodiment of the present invention is illustrated. Similarly another table 2 shows the paraxial refractive power arrangement of the second embodiment.

In this embodiment, the refractive power of the second lens group is made slightly stronger to facilitate a further minimization of the bulk and size.

An example of the specific zoom lens employing the paraxial refractive power arrangement of the embodiment 1 cited in table 1 can be constructed in accordance with the numerical data given in table 3.

Figure 4:
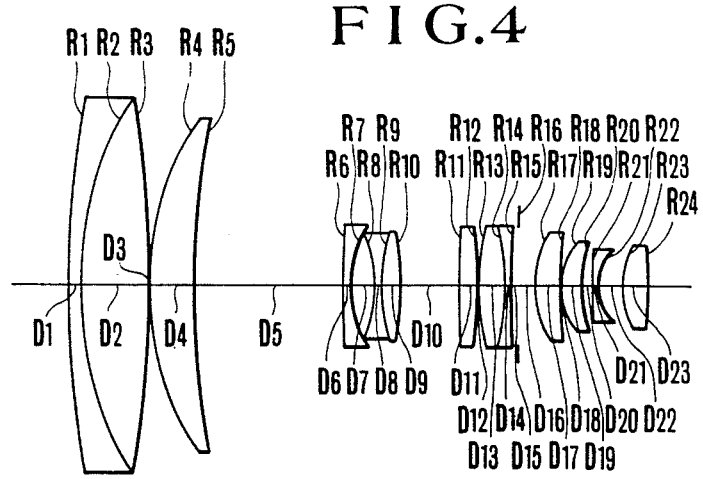
FIG. 4 is a longitudinal section view of the first embodiment of the zoom lens according to the present invention.

Also the longitudinal section of the zoom lens of table 3 is illustrated in FIG. 4 and its various aberrations in FIG. 5. As is evident from FIGS. 4 and 5, the complete zoom lens is very compact, particularly regarding the longitudinal dimension, while nevertheless maintaining a high standard of aberration correction throughout the increased range.

In table 3, Ri is the radius of curvature of the i-th lens surface counting from front, Di is the i-th lens thickness or air separation counting from front, and Ni and $vi$ are the refractive index and Abbe number of the glass of the i-th lens element counting from front respectively.

TABLE 1

| Paraxial Refractive Power Arrangement of Embodiment 1 | | |
|---|---|---|
| | Shortest Focal Length Setting | Longest Focal Length Setting |
| Focal Length of Entire System | 1.00 | 5.92 |
| f1 | 6.000 | |
| f2 | −1.318 | |
| f3 | 3.273 | |
| f4 | 2.505 | |
| e1 | 0.727 | 4.091 |
| e2 | 2.727 | 0.727 |
| e3 | 1.091 | 1.206 |
| β2 | −0.333 | −2.231 |
| β3 | −2.700 | −1.910 |
| β4 | 0.185 | 0.231 |

TABLE 2

| Paraxial Refractive Power Arrangement of Embodiment 2 | | |
|---|---|---|
| | Shortest Focal Length Setting | Longest Focal Length Setting |
| Focal Length of Entire System | 1.00 | 6.00 |
| f1 | 5.968 | |
| f2 | −1.137 | |
| f3 | 2.778 | |
| f4 | 2.205 | |
| e1 | 1.264 | 4.323 |
| e2 | 2.212 | 0.544 |
| e3 | 0.765 | 0.891 |
| β2 | −0.319 | −2.237 |
| β3 | −2.979 | −1.922 |
| β4 | 0.176 | 0.233 |

TABLE 3

F = 1.00 − 5.92  FNo. = 1:1.4  2ω = 53.1° −9.66°

| R1 = 13.691 | D1 = 0.20 | N1 = 1.80518 | v1 = 25.4 |
| R2 = 5.081 | D2 = 1.00 | N2 = 1.51633 | v2 = 64.1 |
| R3 = −14.585 | D3 = 0.01 | | |
| R4 = 3.876 | D4 = 0.64 | N3 = 1.69680 | v3 = 55.5 |
| R5 = 12.945 | D5 = Variable | | |
| R6 = 21.285 | D6 = 0.10 | N4 = 1.77250 | v4 = 49.6 |
| R7 = 1.483 | D7 = 0.37 | | |
| R8 = −1.706 | D8 = 0.10 | N5 = 1.77250 | v5 = 49.6 |

TABLE 3-continued

| | | | |
|---|---|---|---|
| R9 = 2.426 | D9 = 0.27 | N6 = 1.84666 | ν6 = 23.9 |
| R10 = −5.315 | D10 = Variable | | |
| R11 = 58.698 | D11 = 0.27 | N7 = 1.77250 | ν7 = 49.6 |
| R12 = −6.617 | D12 = 0.01 | | |
| R13 = 3.194 | D13 = 0.38 | N8 = 1.78590 | ν8 = 44.2 |
| R14 = −4.195 | D14 = 0.09 | N9 = 1.84666 | ν9 = 23.9 |
| R15 = 13.585 | D15 = 0.09 | | |
| R16 = Stop | D16 = Variable | | |
| R17 = 1.382 | D17 = 0.36 | N10 = 1.65160 | ν10 = 58.6 |
| R18 = 5.021 | D18 = 0.01 | | |
| R19 = 0.926 | D19 = 0.32 | N11 = 1.60311 | ν11 = 60.7 |
| R20 = 2.034 | D20 = 0.14 | | |
| R21 = 4.183 | D21 = 0.09 | N12 = 1.84666 | ν12 = 23.9 |
| R22 = 0.617 | D22 = 0.36 | | |
| R23 = 1.152 | D23 = 0.36 | N13 = 1.62004 | ν13 = 36.3 |
| R24 = −7.925 | | | |

| Focal Length | D5 | D10 | D16 |
|---|---|---|---|
| 1.00 | 0.06 | 2.14 | 0.50 |
| 2.74 | 2.19 | 0.87 | 0.26 |
| 5.92 | 3.42 | 0.14 | 0.62 |

In FIG. 5, the various aberrations are shown in different zoom positions. In this embodiment, the optical total length is 8.56 when in the shortest focal length setting, and 9.92 when in the longest focal length setting, and the telephoto ratio is 1.45. The term "optical total length" herein used means the distance from the front vertex to the image plane, and the term "telephoto ratio" means the value obtained by dividing the shortest optical total length by the longest focal length.

Though the first and second embodiments of the invention have been described in connection with the use of the four lens groups constituting the complete zoom lens, further refinements are very possible within the spirit and scope not exceeding the technical idea of the present invention. For example, the fourth lens group may be newly followed by an additional or fifth lens group by which further improved results of aberration correction can be attained. It is also possible to use the added or fifth lens group as the focusing one.

In the foregoing or first and second embodiments, only one lens group is made to move non-linearly, while the remaining zoom groups are made to move linearly. This offers advantage that low unit cost production techniques may be used in manufacturing operating mechanisms with the cam groove cut in the lens barrel. In this connection, modifications also are possible when two or more of the zoom groups are made to move non-linearly. This produces the advantage that the degree of freedom of the movement control is increased so that the aberrational problem becomes easy to solve.

Focusing of the zoom lens of the invention may be carried out either by moving the entire system, or by moving one of the lens groups, or by moving two or more of the lens groups either as a unit of in differential relation to each other. The use of two or more lens groups in focusing is advantageous at aberration correction.

What we claim:

1. A high magnification range zoom lens comprising: three lens groups and another lens group behind the three lens groups;
said three lens groups and said another lens group being, from front to rear,
a first lens group having a positive refractive power,
a second lens group having negative refractive power,
a third lens group having a positive refractive power, said third lens group having a negative image magnification and being arranged so that the light flux coming out of the third lens group converges, and
said another lens group having a positive refractive power,
wherein said zooming is performed by holding said third lens group stationary and moving said first and second lens groups and said another lens group, and
when in the telephoto position, said first lens group lies closer to the object end, and said second lens group lies closer to the image end than in the wide angle position.

2. A high magnification range zoom lens according to claim 1, wherein said fourth lens group moves to depict a curved path convex toward the front when zooming is performed from the wide angle to the telephoto position.

3. A zoom lens as in claim 1, wherein, when zooming, said second lens group uses an image magnification range including unity.

4. A high magnification range zoom lens comprising: four lens groups:
said four lens groups being, from front to rear,
a first lens group having a positive refractive power,
a second lens group having negative refractive power,
a third lens group having a positive refractive power, said third lens group having a negative image having a negative image magnification and being arranged so that the light flux coming out of the third lens group coverges, and
a fourth lens group having a positive refractive power,
wherein said zooming is performed by holding said third lens group stationary and moving said first and second lens groups and said fourth lens group,
when zooming, said second lens group uses an image magnification range including unity, and
when in the telephoto position, said first lens group lies closer to the object end, and said second lens group lies closer to the image end than in the wide angle position.

5. A zoom lens as in claim 4, wherein said fourth lens group moves to depict a curved path convex toward the front when zooming is performed from the wide angle to the telephoto position.

* * * * *